United States Patent
Maggioni et al.

(10) Patent No.: US 6,833,688 B2
(45) Date of Patent: Dec. 21, 2004

(54) LOOP-TYPE VOLTAGE REGULATING DEVICE

(75) Inventors: Giampiero Maggioni, Cornaredo (IT); Maurizio Gallinari, Pavia (IT); Claudio Serratoni, Milan (IT); Marco Morelli, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/740,737

(22) Filed: Dec. 18, 2000

(65) Prior Publication Data

US 2001/0050544 A1 Dec. 13, 2001

(30) Foreign Application Priority Data

Jun. 13, 2000 (IT) ...................................... MI2000A1321

(51) Int. Cl.[7] ............................ H02H 7/06; H02P 11/00; H02P 9/00
(52) U.S. Cl. ............................................ 322/28; 322/29
(58) Field of Search ............................... 322/28, 15, 29

(56) References Cited

U.S. PATENT DOCUMENTS

| | | | | |
|---|---|---|---|---|
| 4,629,968 A | * | 12/1986 | Butts et al. .................... 322/29 |
| 4,686,375 A | * | 8/1987 | Gottfried ........................ 290/2 |
| 4,803,376 A | * | 2/1989 | N'Guyen ..................... 290/22 |
| 5,252,926 A | * | 10/1993 | Menegoli ..................... 324/545 |
| 5,719,485 A | * | 2/1998 | Asada .......................... 322/24 |
| 5,744,941 A | * | 4/1998 | Bartol et al. .................. 322/25 |
| 6,003,304 A | * | 12/1999 | Swanson et al. .............. 60/274 |
| 6,014,016 A | * | 1/2000 | Maruyama et al. ........... 322/28 |
| 6,064,186 A | * | 5/2000 | Pierret et al. ................. 322/28 |
| 6,078,203 A | * | 6/2000 | Zafarana et al. ............. 327/174 |
| 6,147,474 A | | 11/2000 | Koss et al. .................... 322/59 |
| 6,184,661 B1 | * | 2/2001 | Becker et al. ................ 322/25 |
| 6,194,877 B1 | * | 2/2001 | Judge et al. ................. 320/162 |
| 6,215,285 B1 | * | 4/2001 | Harmon ........................ 322/29 |
| 6,218,814 B1 | * | 4/2001 | Kohl et al. ................... 322/28 |
| 6,225,790 B1 | * | 5/2001 | Harmon ........................ 322/28 |
| 6,344,734 B1 | * | 2/2002 | Iwatani et al. ................ 322/24 |
| 6,400,125 B1 | * | 6/2002 | Pierret et al. ................. 322/29 |

FOREIGN PATENT DOCUMENTS

| | | |
|---|---|---|
| DE | 197 32 961 A1 | 2/1999 |
| JP | 359076198 A * | 5/1984 |
| JP | 402051400 A * | 2/1990 |
| JP | 404299100 A * | 10/1992 |

OTHER PUBLICATIONS

Graf, Rudolf, Dictionary of Electronics, (1999), Butterworth–Heinemann, Ninth Edition, pp. 637, 631, 550,551.*
Sedra/Smith, Microelectronics Circuits, (1998) Oxford Univerity Press, Inc., Fouth Edition, pp. 125, 179, 180.*

* cited by examiner

Primary Examiner—Joe Waks
Assistant Examiner—Julio Gonzalez
(74) Attorney, Agent, or Firm—Lisa K. Jorgenson; E. Russell Tarleton; Seed IP Law Group PLLC

(57) ABSTRACT

A loop-type voltage regulating device, particularly for regulating a voltage of an automotive electric system that includes at least one thermal engine, a voltage regulator and an alternator operative to deliver a system regulated-voltage signal to and receive a regulation signal from the voltage regulator, the voltage regulating device including a control unit within the regulating loop, which unit is connected between the thermal engine and the voltage regulator and is adapted to supply the latter with a signal related to the engine operation.

8 Claims, 3 Drawing Sheets

LOOP-TYPE VOLTAGE REGULATING DEVICE

TECHNICAL FIELD

The present invention relates to a voltage regulating device, and, more specifically to a loop-type voltage regulating device, particularly for regulating a voltage of an automotive electric system, including at least one thermal engine, a voltage regulator and an alternator operative to deliver a system regulated voltage signal to and receive a regulation signal from the voltage regulator, and to a method of loop regulating a voltage.

BACKGROUND OF THE INVENTION

Automotive electric systems are known to incorporate provisions for regulating the system voltage according to the thermal engine rotational speed.

At low rpm (revolutions per minute), a thermal engine as used for automobile vehicles is bound to develop a low drive torque. In this condition, connecting in an electric load of substantial magnitude, such as an air-conditioning apparatus, may cause the engine to quit because the alternator coupled thereto, in order to supply the amount of current required, would demand a higher torque than the engine can produce.

Shown generally and schematically at 1 in FIG. 1 is a conventional voltage regulating device for an automotive electric system.

The regulating device 1 includes essentially an alternator 2, a battery 3 and a voltage regulator 4, being connected in parallel together.

The voltage regulator 4 includes:

A first terminal TR'1, being connected to a first terminal TA'1 of the alternator 2 and receiving a phase signal PH;

a second terminal TR'2 connected to a second terminal TA'2 of the alternator 2 and connected to a voltage reference, specifically a ground voltage GND;

a third terminal TR'3 connected to a third terminal TA'3 of the alternator 2 and receiving a regulated-voltage signal A+; and a fourth terminal TR'4 connected to a fourth terminal TA'4 of the alternator 2 and delivering a regulation signal DF.

Based on the phase signal PH from the alternator 2, the voltage regulator 4 will essentially monitor the regulated-voltage signal A+ and regulate it by means of the regulation signal (or field driver) DF.

Thus, in the regulating device 1, the phase signal PH is utilized to provide an indication of the engine state of operation through the operation of the alternator 2. In fact, with the engine crankshaft coupled to the alternator shaft by a pulley drive, the alternator rpm will be proportional to the engine rpm.

This scheme is found in many commercially available regulators, whereby the phase signal from the alternator is analyzed and different strategies are used, according to the signal width and frequency, to control the system regulated-voltage signal.

FIG. 2 shows in greater detail a voltage regulator 4 of a type currently employed in automotive electric systems.

The voltage regulator 4 comprises a threshold comparator 5 connected between first and second terminals, TR'1 and TR'2, of the voltage regulator 4, and is biased at its input by a voltage source VB. The threshold comparator 5 is connected with its output to a plurality of switches SW1, . . . SWN which are controlled by a plurality of buffers I1, . . . IN according to the frequency value fPH of the phase signal PH at the first terminal TR'1, as well as according to reference values f1, . . . fN set by said buffers I1, . . . IN.

The controlled switches SW1, . . . SWN are connected directly to the fourth terminal TR'4 of the voltage regulator 4 as well as to the third terminal TR'3 through a plurality of ramp comparators CR1, . . . CRN.

The voltage regulator 4 of FIG. 2 operates as follows. According to the frequency fPH of the phase signal PH at the first terminal TR'1, the voltage regulator 4 will regulate the system voltage A+ using different time constants that have been set by the buffers I1, . . . IN according to the operational state of the vehicle engine. In particular, the buffers I1, . . . IN will close one of the switches SW1, . . . SWN to connect, via a ramp comparator CR1, . . . CRN, the third terminal TR'3 of the voltage regulator 4, whereat the regulated-voltage signal A+ is present, to the fourth terminal TR'4 of the voltage regulator, whereat the regulation signal DF is present.

When no signal is received by the alternator 2, or if its frequency is less than a first reference value f1, no switches SW1, . . . SWN would be closed and the voltage regulator 4 would be switched off to a stand-by condition.

In the presence of a heavy electric load while the engine is at low rpm, the voltage regulator 4 will control the torque to the alternator 2 to increase proportionally, so that a current can be generated to match the load. Thus, an E.C.U. (Engine Control Unit) 6 of an automotive thermal engine 7 is enabled to increase the engine rpm, without switching off the thermal engine 7, as shown schematically in FIG. 3.

In particular, the voltage regulator 4 controls the alternator 2 by means of the regulation signal DF and according to the information received from the alternator 2 itself through the phase signal PH and the regulated-voltage signal A+.

Similarly, the control unit 6 will receive from the engine 7, via a plurality of sensors, various information INF concerning the engine state, and will act on it by a plurality of signals AT, generally designated as actuators.

While being in many ways advantageous, this prior scheme has a drawback in that the voltage regulator 4 obtains the information about the engine operation from the rotational speed of the alternator 2, thus losing concurrence of this information. In fact, by the time that the engine rpm is derived from the alternator rotation, the engine may have changed its state and the voltage regulation proves less than optimum for the system.

The underlying technical problem of this invention is to provide a voltage regulating device, particularly for automotive electric systems, with such structural and functional features as to optimize the system voltage regulation, thereby overcoming the limitations of known devices.

SUMMARY OF THE INVENTION

The resolutive idea proposed by the invention is based on using the system control unit to let a voltage regulator know the operational state of the engine in real time.

The disclosed embodiment of the invention is directed to a voltage regulating system and device in an automotive electric system having at least one thermal engine, a voltage regulator, and an alternator operative to deliver a system-regulated voltage signal 2 and receive a regulation signal from the voltage regulator, and further including a control unit within the regulating loop, the control unit connected between the thermal engine and the voltage regulator and adapted to supply the voltage regulator with a signal corresponding to the operation of the engine for regulating the voltage delivered from the alternator. The disclosed embodiments also relate to a method of loop regulating a voltage, in particular a voltage of an automotive electric system, that includes detecting variables related to the operation of a thermal engine by having a control unit connected to the engine; real-time processing the variables detected by the control unit in order to assess the actual conditions of the thermal engine operation; and regulating a system voltage according to the detected engine operating conditions using a voltage regulator connected in turn to an alternator of the thermal engine.

BRIEF DESCRIPTION OF THE DRAWINGS

The features and advantages of the voltage regulating device according to the invention will be apparent from the following description of an embodiment thereof, given by way of non-limitative example with reference to the accompanying drawings, wherein.

DETAILED DESCRIPTION OF THE INVENTION

Figure 4:
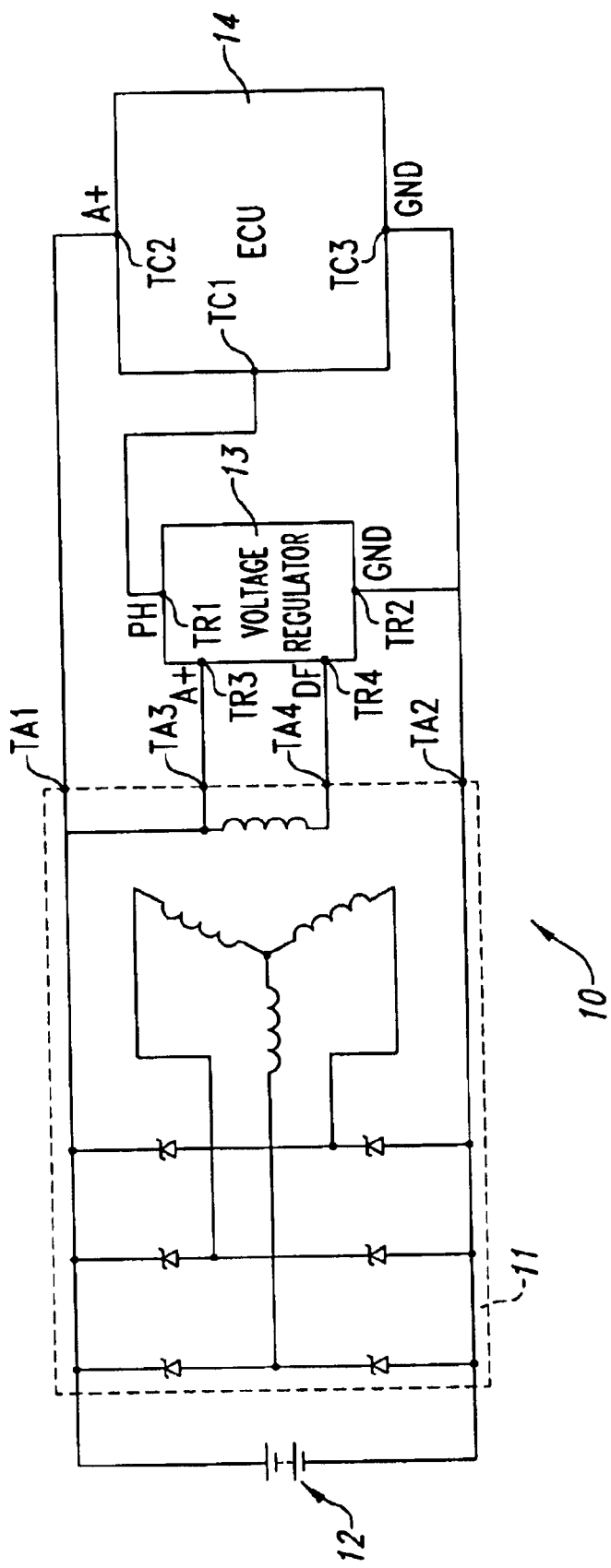
FIG. 4 shows schematically a voltage regulating device for an automotive electric system according to the invention.

With reference to the drawings, and in particular to FIG. 4 thereof, a voltage regulating system for an automotive electric system, according to this invention, is shown generally at 10 in schematic form.

The voltage regulating system 10 includes essentially an alternator 11, a battery 12, and a voltage regulator 13.

The voltage regulator 13 has a first terminal TR1 connected to a first terminal TC1 of a control unit 14 and arranged to receive a phase signal PH.

The control unit 14 itself has a second terminal TC2 connected to a first terminal TA1 of the alternator 11 and arranged to receive a regulated-voltage signal A+, and has a third terminal TC3 connected to a second terminal TA2 of the alternator 11, as well as connected to a second terminal TR2 of the voltage regulator 13 and connected to a voltage reference, in particular a ground voltage reference GND.

The voltage regulator 13 also has a third terminal TR3 connected to a third terminal TA3 of the alternator 11 and arranged to receive the regulated-voltage signal A+, and has a fourth terminal TR4 connected to a fourth terminal TA4 of the alternator 11 and arranged to deliver a regulation signal DF.

Figure 1:
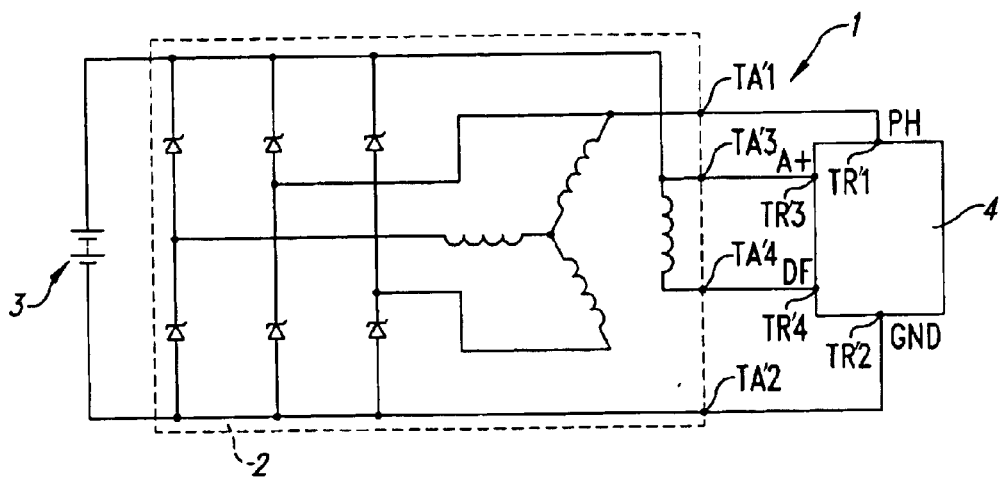
FIG. 1 shows schematically a voltage regulating device of a known automotive electric system.
Figure 2:
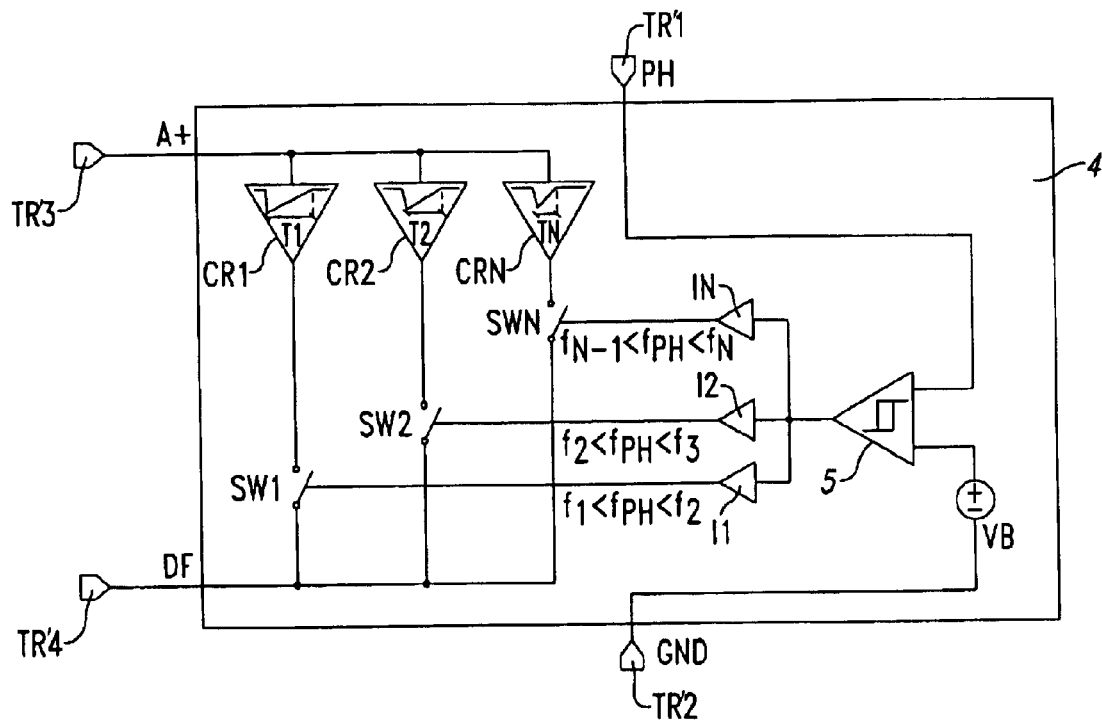
FIG. 2 shows schematically a detail of the device of FIG. 1.
Figure 3:
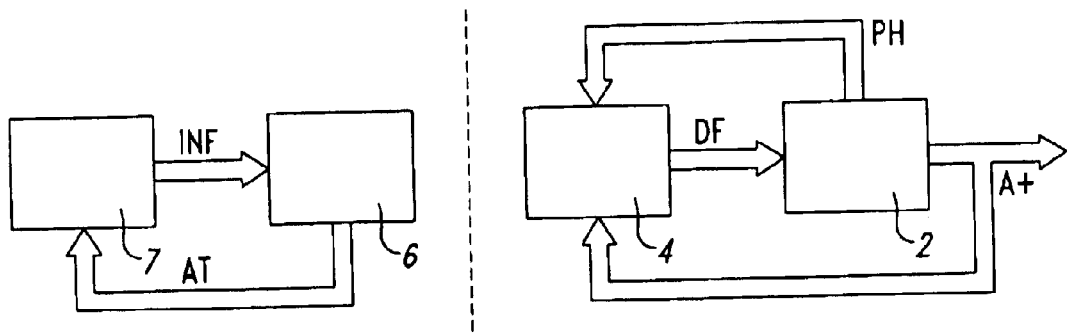
FIG. 3 shows schematically the principle of operation of the device shown in FIG. 1.
Figure 5:
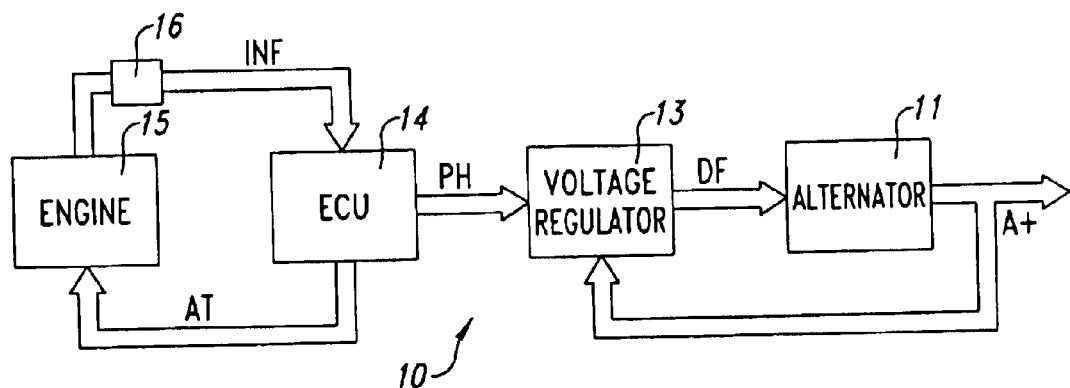
FIG. 5 shows schematically the principle of operation of the device shown in FIG. 4.

In this way, the control unit 14 is used to keep the voltage regulator 13 informed about the operational state of the thermal engine 15, as shown schematically in FIG. 5.

In particular, the voltage regulating system 10 includes a regulating loop comprising in turn the thermal engine 15, the alternator 11, the voltage regulator 13, and the control unit 14, the latter controlling the voltage regulator 13 by means of the phase signal PH.

The control unit 14 is in fact normally connected to a plurality of sensors 16 that provide it with different variables INF related to the operation of the engine 15. Among other parameters, the control unit 14 will have information or data about the drive torque value, engine rpm, engine temperature, and whether the driver of the vehicle is speeding up. In addition, the control unit 14 will monitor the load applied to the electric system.

All this information is processed rapidly due to the high calculating capacity of the control unit 14, to supply the engine with the proper amount of fuel/air, control the opening and closing times of valves, and to provide other functions generally indicated in FIG. 5 as actuators AT.

In other words, the control unit 14, and the information processed and contained therein, provide a very accurate real-time assessment of the operational state of the engine, and allow subsequent changes of this state to be predicted.

Advantageously in this invention, existing control units 14 in the electric systems of automobile vehicles are utilized to drive a voltage regulator 13 for optimum system voltage and, hence, provide extended life of the battery 12 utilized in such system.

Also, advantageously according to this invention, the engine minimum rpm can be kept down, and with it, the emission of polluting exhaust gases.

It should be noted that the voltage regulating system 10 of this invention uses a conventional voltage regulator 13, the control unit 14 supplying, on its first terminal TC1, a phase signal PH in the form of a square-wave signal having similar characteristics as the phase signal from the alternator 11 and being processable by a conventional voltage regulator 13.

The operation of the voltage regulating system 10 according to the invention will now be described.

According to the frequency fPH of the phase signal PH from the control unit 14, the voltage regulator 13 operates to regulate the system voltage A+ by the application of different time constants according to the operational state of the engine, as previously explained in connection with the state of the art.

In particular, these time constants can be set by suitable buffers arranged to close corresponding switches within the voltage regulator 13.

When no signal reaches the control unit 14, or its frequency is less than a minimum value f1, no switches are closed, and the voltage regulator 13 is switched off to a stand-by condition.

Briefly, whereas conventional devices for regulating the voltage in an automotive electric system perform a loop type of regulation through the engine/alternator/regulator combination, utilizing the phase signal from the alternator to control the system voltage regulator, the voltage regulating device of this invention also incorporates the system control unit with the regulation loop, and uses the phase signal from the control unit, specifically a square-wave signal which is compatible with the voltage regulators currently in use.

While a representative embodiment of the invention has been illustrated and described, it is to be understood that various changes may be made therein without departing from the scope of the invention. Hence, the invention is to be limited only by the scope of the claims that follow and the equivalents thereof.

What is claimed is:

1. A loop-type voltage regulating device, particularly for regulating a voltage of an automotive electric system that has at least one thermal engine, a voltage regulator, and an alternator operative to deliver a system-regulated voltage signal to and receive a regulation signal from the voltage regulator, comprising: a control unit connected between said thermal engine and said voltage regulator, the control unit adapted to receive the system-regulated voltage signal from the alternator without receiving a phase signal from the alternator and at least one engine operation signal pertaining to one from among engine torque value, engine rpm, and engine temperature, and in response thereto to supply said voltage regulator with a signal corresponding to the engine operation for controlling the regulated voltage signal delivered from the alternator, said voltage regulator having at least a first terminal connected to a first terminal of the control unit, the control unit arranged to deliver said phase signal to said voltage regulator.

2. The voltage regulating device of claim 1, wherein said control unit supplies said voltage regulator with a suitable square-wave phase signal for processing by the voltage regulator.

3. The voltage regulating device of claim 2, wherein said control unit delivers, on its first terminal, a phase signal in the form of a square-wave signal having similar characteristics as a phase signal from the alternator and being processable by a conventional voltage regulator.

4. The voltage regulating device of claim 2, wherein said voltage regulator comprises a plurality of buffers and switches effective to regulate the system voltage signal by application of different time constants according to the operational state of the engine and the frequency of the phase signal from the control unit.

5. The voltage regulating device of claim 1, wherein said control unit has at least a second terminal connected to said alternator to receive the system-regulated voltage signal.

6. The voltage regulating device of claim 1, wherein said control unit is connected to a plurality of sensors providing it with a set of variables related to the engine operation.

7. A method of loop regulating a voltage, in particular a voltage of an automotive electric system, comprising:

detecting variables related to the operation of a thermal engine by having a control unit connected to the engine, the variables comprising at least one from among engine torque, engine temperature, and engine rpm;

generating a phase signal in response to the variables detected by the control unit; and regulating a system voltage generated by an alternator using the phase signal that is processed by a voltage regulator connected in turn to the alternator of the thermal engine and without using a phase signal from the alternator, including generating a phase signal from the control unit that is adapted to be processed by the voltage regulator.

8. The method of claim 7, wherein detecting variables comprises receiving engine performance signals directly from at least one sensor associated with the thermal engine.

* * * * *